United States Patent [19]

Urmston et al.

[11] Patent Number: 4,738,370
[45] Date of Patent: Apr. 19, 1988

[54] THREADED THERMOPLASTIC CLOSURE WITH VENT SLOT

[76] Inventors: Hugh C. Urmston, 762 W. Shore Trail, Sparta, N.J. 07871; Elmer E. Pohlenz, 304 Kinsey St., Richmond, Ind. 47374

[21] Appl. No.: 2,349

[22] Filed: Jan. 12, 1987

Related U.S. Application Data

[62] Division of Ser. No. 854,771, Apr. 22, 1986, Pat. No. 4,657,221.

[51] Int. Cl.⁴ ............................................. B65D 51/16
[52] U.S. Cl. .................................................... 215/307
[58] Field of Search ................. 215/307, 260, 332; 220/366

[56] References Cited

U.S. PATENT DOCUMENTS

| | | | |
|---|---|---|---|
| 613,371 | 11/1898 | Hoffman et al. | 215/332 |
| 3,556,334 | 1/1971 | Howard | 215/31 |
| 4,007,848 | 2/1976 | Snyder | 215/31 |
| 4,007,851 | 2/1976 | Walker | 215/307 |
| 4,206,852 | 6/1980 | Dunn et al. | 215/252 |
| 4,369,889 | 1/1983 | Ostrowsky | 215/307 X |
| 4,392,055 | 7/1983 | Whitney | 215/307 |
| 4,427,126 | 1/1984 | Ostrowsky | 215/307 |

FOREIGN PATENT DOCUMENTS

| | | |
|---|---|---|
| 0009854 | 4/1980 | European Pat. Off. . |
| 886861 | 8/1953 | Fed. Rep. of Germany ...... 215/332 |

*Primary Examiner*—Donald F. Norton
*Attorney, Agent, or Firm*—Thomas J. Connelly

[57] ABSTRACT

A male core designed to be mateable with a female mold for forming vent slots in a thermoplastic closure. The male core comprises a cylindrical member having an end surface which forms an underside top surface and an inside surface of a downwardly depending skirt on the closure. A helical groove is formed about the periphery of the cylindrical member which forms a thread on the inside surface of the skirt. At least one integral rib is formed in the cylindrical member which is arranged parallel to the longitudinal axis of the closure. The rib forms a vent slot in the closure which traverses the thread. Convoluted surfaces are formed on the cylindrical member which extend from each side surface of the rib to the bottom of adjacent helical grooves. The convoluted surfaces provide smooth radii on the ends of the threads adjacent to the vent slot which facilitate axial stripping of the closure from the male core without deforming the threads into the vent slot. This enhances the passage of pressurized gas through the vent slot to the atmosphere as the closure is removed from a container.

14 Claims, 3 Drawing Sheets

THREADED THERMOPLASTIC CLOSURE WITH VENT SLOT

This application is a division of application Ser. No. 854,771, filed Apr. 22, 1986, now U S. Pat. No. 4,657,221.

FIELD OF THE INVENTION

This invention relates to a male core which is mateable with a female mold for forming vent slots in a thermoplastic closure and also the closure itself.

BACKGROUND OF THE INVENTION

In the past, the method for forming a vent slot in a thermoplastic closure was to first form helical screw threads on the periphery of a cylindrical male core. One or more vertical grooves would then be formed in the cylindrical male core which would traverse the helical threads. An insert was then placed in each of the vertical grooves so that the male core configuration would be the exact opposite of the inside of the closure. When the closure was subsequently axially stripped from the male-core, the sharp corners on the threads, which were formed at the point where the threads met the sides of the insert, tended to deform in a downward direction. This downward deformation toward the open end of the closure tended to partially block the flow of pressurized gas which would pass along the underside of the thread as well as preventing the outward flow of pressurized gas through the vent slot. The slight deformation is frowned upon by the bottlers of carbonated beverages for it could create potential product liability should an injury occur due to improper venting of the pressurized gas within a container while a consumer removed the cap from the closure. The downward deformation of the closure thread is also hard to visually detect upon a rapidly moving conveyor belt, thereby making it difficult for a quality control operator to remove such closures before shipment. Besides the above-stated disadvantages, the shipment of such closures to the bottlets could degrade the quality of the closure manufacturer which could eventually discourage other potential customers from purchasing his product.

U.S. Pat. Nos. 4,392,005; 4,206,852; B1 4,427,126; and 3,556,334: and European Patent Application No. 79 30 0083.7 show examples of closures having a vent slot formed therein. U.S Pat. Nos. 4,007,848 and 4,007,851 show the use of vent slots formed in the container rather than in the closure and onto which a metal closure is roll formed.

Now a male core has been invented which will overcome the deficiencies of the prior art. This male core will also form a thermoplastic closure having a thread which is less susceptible to being deformed as it is axially stripped from the male core.

SUMMARY OF THE INVENTION

Briefly, the present invention relates to a male core which is mateable with a female mold for forming vent slots in a thermoplastic closure. The male core includes a cylindrical member having a helical groove formed about the outer periphery thereof which forms a thread on an inside surface of a thermoplastic closure. At least one integral rib is formed in the cylindrical member and is arranged parallel to the longitudinal axis of the closure. The rib forms a vent slot in the closure which traverses the thread. Convoluted surfaces are also formed in the cylindrical member which extend from each side surface of the rib to the bottom of adjacent helical grooves. The convoluted surfaces provide smooth radii on the ends of the threads adjacent to the vent slot which facilitates the axial stripping of the closure from the male mold without deforming the threads into the vent slot. By preventing the threads from being deformed into the vent slot, one is assured that the passage of pressurized gas through the vent slot to the atmosphere will occur as the closure is removed from a container.

The general object of this invention is to provide a male core which is mateable with a female mold for forming vent slots in a thermoplastic closure. A more specific object of this invention is to provide a male core having integral ribs formed therein so as to eliminate the presence of sharp corners which would be transferred to the molded thermoplastic closure.

Another object of this invention is to provide a male core for forming a thermoplastic closure which has a helical thread formed about its periphery by electrical discharge machining and which is traversed by one or more vertical ribs.

Still another object of this invention is to provide a male core which is mateable with a female mold for forming vent slots in a thermoplastic closure wherein the vent slots contain radii at the intersection point with a helical thread so as to permit the closure to be axially stripped from the male mold without deforming the ends of the threads.

A further object of this invention is to provide a thermoplastic closure formed by using the male core of this invention in conjunction with a female mold.

Still further, an object of this invention is to provide a thermoplastic closure having a helical thread traversed by one or more vertical vent slots, the ends of the threads adjacent to the vent slots being rounded so as to permit the closure to be axially stripped from the male mold without being deformed.

Other objects and advantages of the present invention will become more apparent to those skilled in the art in view of the following description and the accompanying drawings.

DETAILED DESCRIPTION OF THE PREFERRED EMBODIMENTS

Figure 1:
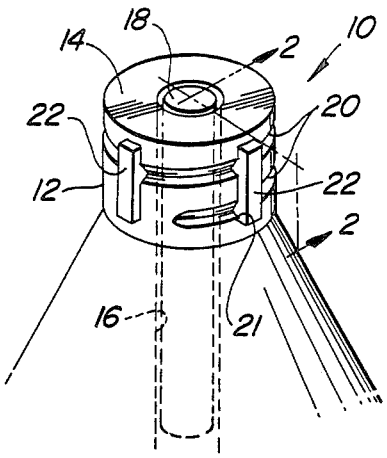
FIG. 1 is a prior art isometric view of a male core for producing a thermoplastic closure showing two inserts attached thereto to form two vent slots in the inside wall of the closure.

FIGS. 1 through 6 refer to prior art tooling and closures produced on such tooling. In FIG. 1, a male core 10, preferably constructed of steel, is shown which includes a cylindrical member 12 having a relatively flat end surface 14. The male core 10 is designed to be inserted into a female mold cavity (not shown) such that a thermoplastic closure can be formed therebetween. The male core 10 can be used in an injection molding operation or in a compression molding operation. The male core 10 also includes an elongated axial bore 16 which houses an axially movable knockout pin 18. A stripper ring (not shown) is normally used to remove the formed closure from the male core 10 after the male core 10 has been separated frdm the final mold. With closures having a heat-formable band, the band tends to cling to the inside surface of the stripper ring, and the knockout pin 18 is designed to push the formed closure off of the stripper ring. The male core 10 also has a helical groove 20 formed about its periphery which is traversed by one more vertical grooves 21. Each vertical groove 21 receives an insert 22. In FIG. 1 two such inserts 22 are depicted.

Figure 2:
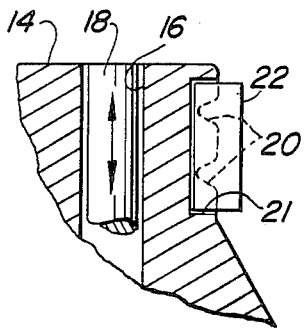
FIG. 2 is a cross-sectional view of the prior art male core taken along line 2—2 of FIG. 1.
Figure 4:
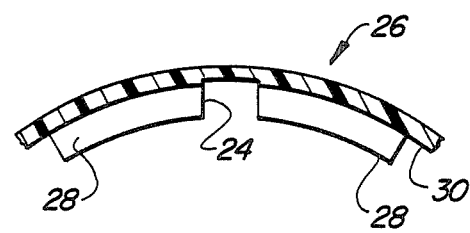
FIG. 4 is a partial cross-sectional view of a thermoplastic closure showing a rectangular vent slot with square corners produced by the prior art male core shown in FIG. 1.
Figure 3:
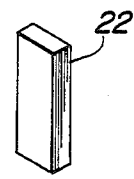
FIG. 3 is an enlarged view of one of the prior art inserts shown in FIG. 1.

The inserts 22, as best shown in FIGS. 2 and 3, consist of a small brass or copper rectangular member, or other easily machinable material, which is inserted into the grooves 21 of the male core 10. The inserts 22 are also known as vent bars. Each insert 22 is designed to product a vent slot 24, see FIG. 4, in a thermoplastic closure 26, preferably made of polypropylene or polyethylene. The vent slots 24 also traverse the closure thread 28 so as to permit the pressurized gas contained in a container to vent as the closure 26 is removed from the container. The depth of the vent slot 24 will depend upon the application of the closure 26. The depth can be adjusted so as to be flush with the inner sidewall 30 or it can actually penetrate the inner sidewall 30 and extend beyond the major diameter of the thread 28 as is shown in FIG. 4.

Figure 5:
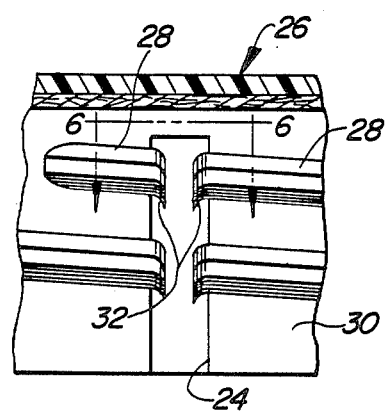
FIG. 5 is an enlarged view of the inside wall of a thermoplastic closure produced by prior art tooling and showing a vent slot having the ends of adjacent threads deformed into it which were caused by axially stripping the closure from the male core.
Figure 6:
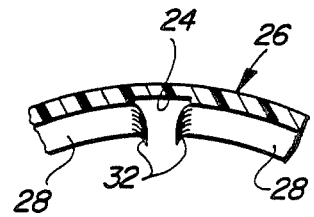
FIG. 6 is a top view taken along line 6—6 of FIG. 5 showing how the deformation of the threads partially closes off the vent slot.

In forming the thermoplastic closures 26 with the prior art tooling, it was customary to cut and size the grooves 21 to accommodate the inserts 22. The inserts 22 were then press fitted into the grooves 21 to create a vertical segment across the helical grooves 20. Since the inside surface of the plastic closure 26 is an exact opposite of the male core 10, the space occupied by the inserts 22 form the vent slots 24 through the closure threads 28. Therefore, any small tolerance or gap present between each insert 22 and groove 21 could cause the formation of a feather or burr which would render the closure 26 defective. In addition, it is impossible to form a convoluted or spherical surface on the end of the helical thread 28, adjacent to the vent slot 24, using an insert 22. This made it impossible to obtain rounded corners on the ends of the thread 28. The square-cornered helical thread 28 produced by the prior art male core 10 would tend to deform as the closure 26 was axially stripped from the male core 10. This axial stripping operation caused the ends of the threads 28, adjacent to the vent slots 24, to be pulled outward and downward into sharp projections 32 as is shown in FIGS. 5 and 6. This downward and outward movement of the threads 28 caused the cross-sectional area of the vent slot 22 to be reduced and therefore reduced the venting capacity of the closure 26 as it was removed from the container. The downward projection 32 also interfered and partially blocked the flow of gas passing along the underside surface of the helical threads 28 and therefore retarded the flow of the pressurized gas into the vent slot 24. In addition, the sharp projectiohs 32 were unacceptable from a number of other standpoints in that they caused bottle thread interference, could also cause cutting of a liner 34 as it was inserted into the plastic closure 26, could cause misalignment of the closure 26 as it was screwed onto a bottle, and presented a poor appearance to a consumer who viewed the closure 26 after having removed it from the container.

Figure 7:
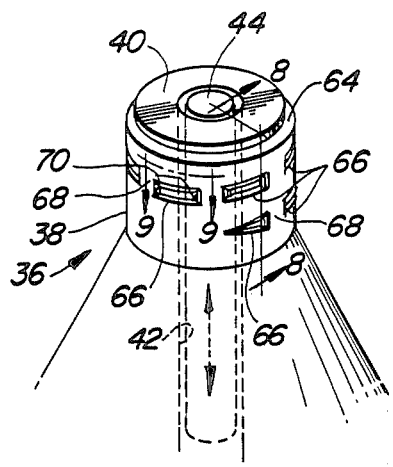
FIG. 7 is an isometric view of the male core of this invention for producing a thermoplastic closure having a helical groove traversed by integral ribs and having concave surfaces extending from the side surfaces of the ribs to the bottom of adjacent grooves which assist in permitting the closure to be axially stripped from the male core without having the threads deform into the vent slots.
Figure 8:
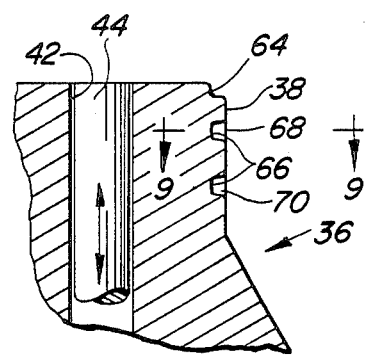
FIG. 8 is a cross-sectional view of the male core taken along line 8—8 of FIG. 7.
Figure 9:
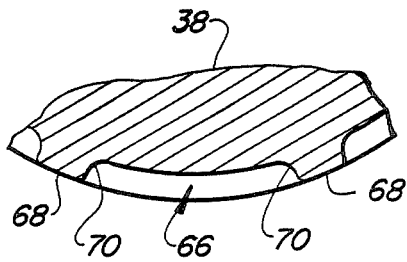
FIG. 9 is a cross-sectional view taken along line 9—9 of FIG. 7 showing a thread forming groove located between two vertical ribs, the groove having concave surfaces located at each end thereof.
Figure 10:
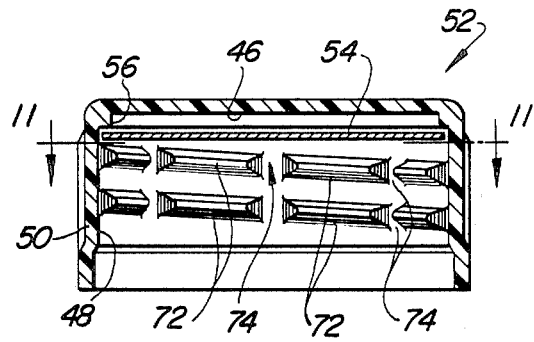
FIG. 10 is a perspective view of a helical thread formed on the inside surface of a thermoplastic closure which is traversed by several vent slots.

Referring to FIGS. 7-10, it was felt that the solution to the problem would be to round off the ends of the helical threads 28 to give them a spherical or convoluted shape. In order to accomplish this, the male core 10 would have to be drastically changed. In FIG. 7 a male core 36 of this invention is shown. The male core 36 includes a cylindrical member 38 having a end surface 40, which is preferably flat. The end surface 40 forms the underside top surface 46 of a closure 52 while the cylindrical member 38 forms the inside sidewall 48 of a downwardly depending skirt 50. There is also an axial bore 42 formed through the male core 36 which has an axially movable knockout pin 44 positioned therein. A stripper ring (not shown) is normally used to remove the formed closure from the male core 36 after the male core 36 has been separated from the female mold. With closures having a heat-formable band, the band tends to cling to the inside surface of the stripper ring, and the knockout pin 44 is designed to push the formed closure 52 off of the stripper ring. The closure 52 is shown in FIG. 10 having a liner 54 inserted therein and having an annular shoulder 56 formed at the intersection of the underside top surface 46 and the inside sidewall 48. The annular shoulder 56 forms a surface for squeezing the liner 54 against an outside rim 58 of a threaded neck 60 as it is applied to a container 62, see FIG. 13.

The male core 36 will be configured to produce a reverse image on the inside surface of the closure 52. In this regard, the male core 36 contains an annular groove 64 formed adjacent to the end surface 40 which forms the annular sealing shoulder 56 in the closure 52. Positioned below the annular groove 64 is a helical groove 66 which has been separated into a number of short thread segments by a plurality of ribs 68. The segments or grooves 66 and the ribs 68 are integrally formed into the cylindrical member 38 by electrical discharge machining. Electrical discharge machining, also referred to as EDM, is a machining process by which a material is removed by melting or vaporizing it in the presence of a dielectric fluid. This is done by using a square wave DC pulse directed through or to an electrode, to or from the workpiece at sufficient voltage. A small gap is present between the two surfaces such that the current will spark across the gap thereby melting minute quantities of the workpiece which are then carried away by the dielectric fluid. The use of a carbon graphite electrode which is configured to the thread shape is then brought into contact with the workpiece by the above-described process. In the EDM process, the male core 36 can be hardened and ground in the normal fashion before the grooves 66 and ribs 68 are formed. The hardening produces a male core 36 which will last through several million cycles while molding plastic closures.

When several thread segments 66 are to be formed on the periphery of the cylindrical member 38, it has been found that it is advantageous to form one or more electrodes to the desired shape and then, through EDM, form the grooves in the workpiece. The workpiece is then rotated a number of degrees and the electrodes are again sunk into the new portion of the periphery so as to form the plurality of grooves. By electrical discharge machining it is possible to form the grooves 66 to a desired shape. In FIG. 9, the groove 66 has a concave, spherical or convoluted surface 70 which extends from the side surfaces of the ribs 68 to the bottom of the helical grooves 66. The height of the rib 68 determines the depth of the vent slot 74. In FIG. 10 the depth of the vent slot 74 is equivalent to the depth of the thread 72 and therefore is flush with the inside surface 48 of the closure 52. However, it should be obvious that the vent slot 74 could extend into the sidewall 48, as is shown in FIG. 4, if this is desired.

Figure 11:
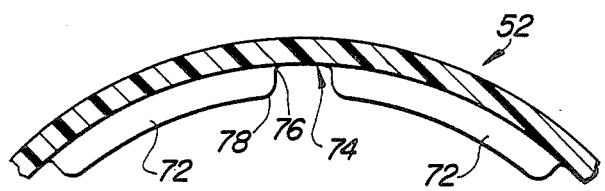
FIG. 11 is a top view taken along line 11—11 of FIG. 10 showing a vent slot having convolutions formed at the inner and outer surfaces where contact is made with the sidewall and the closure thread.

Referring to FIG. 11, the thermoplastic closure 52 produced using the male core 36 in combination with a female mold will have a number of thread segments 72 which are traversed by at least one vent slot 74. For either a 28 or 30 millimeter diameter closure, having either a 6 or 8 pitch thread, the top surface of the thread will be angled approximately 2 to 3 degrees from a horizontal plane passing through the closure. This slight angle will cause the vent slot 74 to be slightly non-perpendicular. Since the male core 36 is formed by electrical discharge machining, it can have a smooth radius or convolution formed both on the inside and outside surfaces 76 and 78, respectively, of the vent slots 74. The convolutions can be formed to any desired radius or dimension so as to permit the closure 52 to be axially stripped from the male core 36 without deforming the ends of the threads 72. From a cost and production standpoint, it is advantageous to axially strip a closure from a male core. However, with some types of closures, the unscrewing method may still be desired, and this is possible when the ends of the threads are rounded adjacent to the vent slots. If the size dimension of the closure 52 increases, it may be desirable to increase each convolution or radius so as to permit such stripping without deforming the threads 72. It should be noted that the vent slots 74 can be arranged equally about the circumference of the cylindrical member or be arranged in a random fashion by forming the ribs 68 in a specific configuration. Electrical discharge machining allows for the use of different width vent slots 74, from a narrow width of 0.020" to a wide width of 0.250". The use of very narrow width vent slots was not possible using the prior art type of male core 10. The use of narrow width vent slots 74 is advantageous in that it enables more thread to be present for securing the closure 52 onto a container. It is also preferable to form the helical grooves 66 such that they produce a right-handed screw thread on the finished closure 52. Furthermore, good results have been obtained by forming the ribs 68 parallel to the longitudinal axis of the male core 36 although it should be noted that the ribs 68 can be slanted or angled if this is desired.

Figure 12:
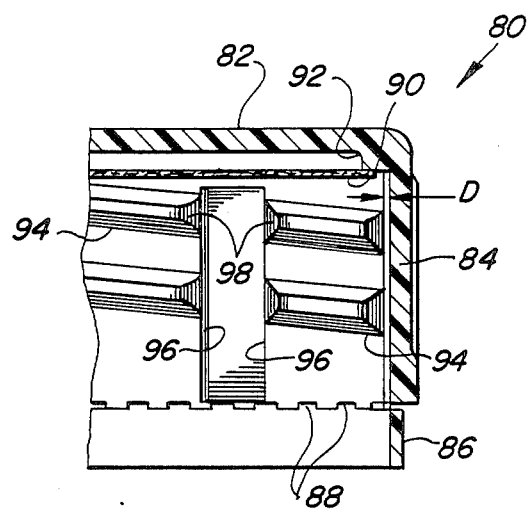
FIG. 12 is a partial perspective view of a thermoplastic closure showing a vent slot which extends past the major diameter of the thread and into the sidewall of the closure skirt.
Figure 13:
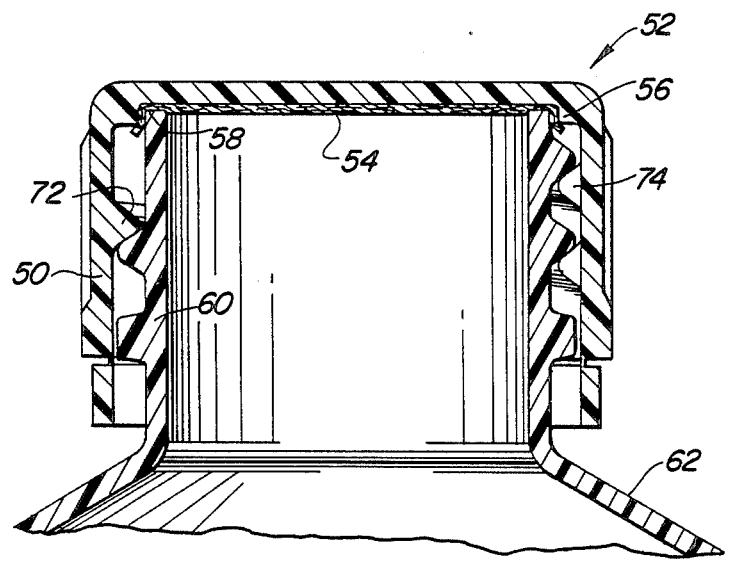
FIG. 13 is a cross-sectional view of a thermoplastic closure applied to the threaded neck of a container and showing a vent slot passing through the thread which is flush with the inside sidewall of the closure skirt.

Referring to FIG. 12, a thermoplastic closure 80 is depicted having a top wall 82, a downwardly depending skirt 84 and a tamper-evident heat-formable band 86. The band 86 is attached to the skirt 84 by a plurality of bridges 88. The closure 80 also includes an enlarged liner 90 which can seal against an annular shoulder 92 and a helical thread 94 which is traversed by a plurality of vent slots 96, only one of which is shown. The vent slots 96 have a depth which passes completely through the height of the threads 94 and into the inside sidewall of the skirt 84. This distance is denoted by "D" and can vary depending upon the thickness of the thermoplastic closure 80. The ends of the threads 94 are radiused at 98 to facilitate axial stripping of the closure 80 from the male core 36. In FIG. 13 the vent slot 74 is shown cutting through the threads 72 formed on the inside surface of the skirt 50.

While the invention has been described in conjunction with several specific embodiments, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. A thermoplastic closure for fitment to a container having a threaded neck terminating in a lip which defines an open mouth, said closure comprising:
   (a) a circular top wall;
   (b) an annular skirt downwardly depending from said top wall having a closure thread formed about an inside surface thereof, said thread cooperating with said threaded neck of said closure to achieve said fitment;
   (c) a sealing system positioned above said closure thread for effecting a gas-tight seal between said closure and said container;
   (d) at least one narrow vent slot formed parallel to the longitudinal axis of said closure which traverses said closure thread, said vent slot having a width no greater than 0.250 inches; and
   (e) sperical surfaces formed on the ends of said closure thread adjacent to said vent slot, said surfaces lying in a plane approximately perpendicular to the longitudinal axis of said closure whereby said surfaces permit said closure to be axially stripped from a male core without deforming said closure thread into said vent slot thereby allowing for the passage of pressuried gas through said vent slot to the atmosphere as said closure is removed from a container.

2. A closure for fitment to a container having a threaded neck terminating in a lip which defines an open mouth, said closure comprising:
(a) a top wall;
(b) a skirt downwardly depending from said top wall having a closure thread formed about an inside surface thereof, said thread coperating with said threded neck of said container to achieve said fitment;
(c) at least one narrow vent slot formed parallel to the longitudinal axis of said closure which traverses said closure thread, said vent slot having a width no greater than 0.250 inches; and
(d) spherical surfaces formed on the ends of said closure thread adjacent to said vent slot which permit said closure to be axially stripped from a male core without deforming said closure thread into said vent slot.

3. The closure of claim 2 wherein said closure is made from a thermoplastic material.

4. The closure of claim 3 wherein said thermoplastic material is polypropylene.

5. The closure of claim 3 wherein said thermoplastic material is polyethylene.

6. The closure of claim 2 wherein said spherical surfaces lie in a plane approximately perpendicular to the longitudinal axis of said closure.

7. The closure of claim 2 wherein said spherical surfaces have a convex configuration.

8. A closure for fitment to a container having a threaded neck terminating in a lip which defines an open mouth, said closure comprising:
(a) a top wall;
(b) a skirt downwardly depending from said top wall having a closure thread formed about an inside surface thereof, said thread cooperating with said threaded neck of said container to achieve said fitment;
(c) sealing means for effecting a gas-tight seal between said closure and said container;
(d) at least one narrow vent slot formed parallel to the longitudinal axis of said closure which traverses said closure thread, said vent slot having a width no greater than 0.250 inches; and
(e) spherical surfaces formed on the ends of said closure thread adjacent to said vent slot and lying in a plane approximately perpendicular to the longitudinal axis of said closure, said surfaces permitting said closure to be axially stripped from a male core without deforming said closure thread into said vent slot thereby facilitating the passage of pressurized gas through said vent slot to the atmosphere as said closure is removed from said container.

9. The closure of claim 8 wherein said sealing means is a liner positioned above said closure thread.

10. The closure of claim 8 wherein said closure is made from a thermoplastic material.

11. The closure of claim 10 wherein said thermoplastic material is polypropylene.

12. The closure of claim 10 wherein said thermoplastic material is polyethylene.

13. A thermoplastic closure for fitment to a container having a threaded neck terminating in a lip which defines an open mouth, said closure comprising:
(a) a circular top wall;
(b) an annular skirt downwardly depending from said top wall having a closure thread formed about an inside surface thereof, said thread cooperating with said threaded neck of said container to achieve said fitment;
(c) at least one narrow vent slot formed parallel to the longitudinal axis of said closure which traverses said closure thread, said vent slot having a width between 0.020 and 0.250 inches; and
(d) spherical surfaces formed on the ends of said closure thread adjacent to said vent slot and lying in a plane approximately perpendicular to the longitudinal axis of said closure, said surfaces permitting said closure to be axially stripped from a male core without deforming said closure thread into said vent slot.

14. A thermoplastic closure for fitment to a container having a threaded neck terminating in a lip which defines an open mouth, said closure comprising:
(a) a circular top wall;
(b) an annular skirt downwardly depending from said top wall having a closure thread formed about an inside surface thereof, said thread cooperating with said threaded neck of said container to achieve said fitment;
(c) a liner positioned above said closure thread for effecting a gas-tight seal between said closure and said container;
(d) at least one narrow vent slot formed parallel to the longitudinal axis of said closure which traverses said closure thread, said vent slot having a width between 0.020 and 0.250 inches; and
(e) spherical surfaces formed on the ends of said closure thread adjacent to said vent slot and lying in a plane approxdximately perpendicular to the longitudinal axis of said closure, said surfaces permitting said closure to be axially stripped from a male core without deforming said closure thread into said vent slot thereby facilitating the passage of pressurized gas through said vent slot to the atmosphere as said closure is removed from said container.

* * * * *

UNITED STATES PATENT AND TRADEMARK OFFICE
CERTIFICATE OF CORRECTION

PATENT NO. :   4,738,370
DATED      :   April 19, 1988
INVENTOR(S) :  Hugh C. Urmston and Elmer E. Pohlenz It is certified that error appears in the above-identified patent and that said Letters Patent is hereby corrected as shown below:

Col. 1, line 42       Change "bottlets" to --bottlers--

Col. 3, line 44       Change "frdm" to --from--

Col. 3, lines 57-58   Change "product" to --produce--

Col. 4, line 31       Change "projectiohs" to --projections--

Signed and Sealed this

Fifteenth Day of November, 1988

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,738,370

DATED : April 19, 1988

INVENTOR(S) : Hugh C. Urmston and Elmer E. Pohlenz

It is certified that error appears in the above-identified patent and that said Letters Patent is hereby corrected as shown below:

On the title page, the following should be inserted:

--[73]   Assignee:   Aluminum Company of America, Pittsburgh, PA--.

Signed and Sealed this

Seventh Day of February, 1989

*Attest:*

DONALD J. QUIGG

*Attesting Officer*   *Commissioner of Patents and Trademarks*